United States Patent [19]

Sloop

[11] 4,198,150

[45] * Apr. 15, 1980

[54] CAMERA-HOLDING FRAME

[76] Inventor: Conrad B. Sloop, 9092 Bermuda Dr., Huntington Beach, Calif. 92646

[*] Notice: The portion of the term of this patent subsequent to Aug. 1, 1995, has been disclaimed.

[21] Appl. No.: 861,118

[22] Filed: Dec. 16, 1977

Related U.S. Application Data

[63] Continuation-in-part of Ser. No. 629,531, Nov. 6, 1975, Pat. No. 4,104,623.

[51] Int. Cl.$^2$ .................. G03B 15/03; G03B 17/56; G03B 29/00
[52] U.S. Cl. ........................ 354/293; 354/82; 362/3
[58] Field of Search .............. 354/293, 80, 81, 82, 354/126; 362/3, 11; 352/243

[56] References Cited

U.S. PATENT DOCUMENTS

| | | | |
|---|---|---|---|
| 3,273,484 | 9/1966 | Lapsley | 352/243 |
| 3,575,098 | 4/1971 | Jones | 354/293 |
| 3,893,145 | 7/1975 | King | 354/293 |
| 4,104,623 | 8/1978 | Sloop | 354/293 |

FOREIGN PATENT DOCUMENTS

| | | | |
|---|---|---|---|
| 750431 | 5/1943 | Fed. Rep. of Germany | 354/293 |
| 796210 | 4/1936 | France | 354/293 |
| 1020159 | 2/1966 | United Kingdom | 354/126 |

Primary Examiner—John Gonzales
Assistant Examiner—Thomas H. Tarcza
Attorney, Agent, or Firm—Frielich, Hornbaker, Wasserman, Rosen & Fernandez

[57] ABSTRACT

A frame which can be held in an upright position, and which can hold a camera so that the camera can be turned from a horizontal to a vertical position without substantially shifting the position of the lens axis, and without utilizing an obstruction behind the back of the camera which would prevent it from opening to change the film. This allows the hand of the photographer, which is grasping a handle such as a palm pad while also turning the lens barrel to focus the lens, to turn the lens barrel at either position of the camera. The apparatus includes a pair of links connecting the frame to a camera mount on which the camera is held, with the links mounted so that when the camera mount rotates 90° the position of a point located a predetermined distance, such as 1½ inches, beyond the camera mount does not undergo a change in position.

13 Claims, 5 Drawing Figures

CAMERA-HOLDING FRAME

CROSS-REFERENCE TO RELATED APPLICATION

This is a continuation-in-part of my earlier patent application Ser. No. 629,531 filed Nov. 6, 1975, now U.S. Pat. No. 4,104,623.

BACKGROUND OF THE INVENTION

This invention relates to camera holding apparatus.

Professional and serious amateur photographers often require camera-holding devices which permit rotation of rectangular format cameras from a horizontal position to a vertical position without requiring the photographer to change the position of the handles on the device. This is useful, for example, where the device also holds a flash unit that must remain above the camera in both its horizontal and vertical orientations. This is also useful for a camera-holding device described in my earlier patent application Ser. No. 629,531 filed Nov. 6, 1975, now U.S. Pat. No. 4,104,623, wherein the photographer can hold the apparatus in the palm of one hand while the fingers of that hand also grasp the lens barrel of the camera to focus the camera, and wherein the lens barrel should not undergo a great change in position during rotation of the camera. The simplest way of pivoting the camera on a frame is to construct the camera mount with a bearing behind the camera axis that rotates on the frame. However, such an arrangement would prevent opening of the rear of the camera for changing backs containing different film types or to replace a roll of film while the camera is still on the apparatus. Considerable ingenuity has been employed in devising an apparatus which will permit rotation of the camera about its lens axis without obstructing the rear of the camera. For example, one device utilizes a large ring within which the front portion of the camera rotates about its axis, and with the ring carrying handles and a flash unit. However, such a ring structure is heavy and awkward. A relatively simple and compact camera holding apparatus which enabled a 90° rotation of a camera about a substantially fixed axis with respect to the frame, without obstructing the back of the camera, would be useful to serious photographers.

SUMMARY OF THE INVENTION

In accordance with one embodiment of the present invention, a moderately compact camera holding apparatus is provided which enables rotation of the camera from a horizontal to a vertical position on a stationary frame, without substantially changing the position of the camera lens. This is accomplished by the use of a four-bar linkage wherein a portion of the camera mount below the camera serves as one link, the frame serves as another link, and a pair of additional links are provided that connect the frame to the mount. A palm pad mounted on the frame, lies under the camera lens, so that the photographer can grasp the palm pad in the palm of one hand while one or more fingers of that hand can reach up to the lens barrel to turn it to focus the camera.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective right side view of the camera holding apparatus, shown with the camera-holding mount in a vertical position, and showing one way in which the apparatus is utilized.

FIG. 2 is a partial perspective left side view of the apparatus of FIG. 1, shown with the mount in a horizontal position.

FIG. 5 is a partial right side elevation view of the apparatus of FIG. 3.

DESCRIPTION OF THE PREFERRED EMBODIMENT

Figures 1, 2, 5:
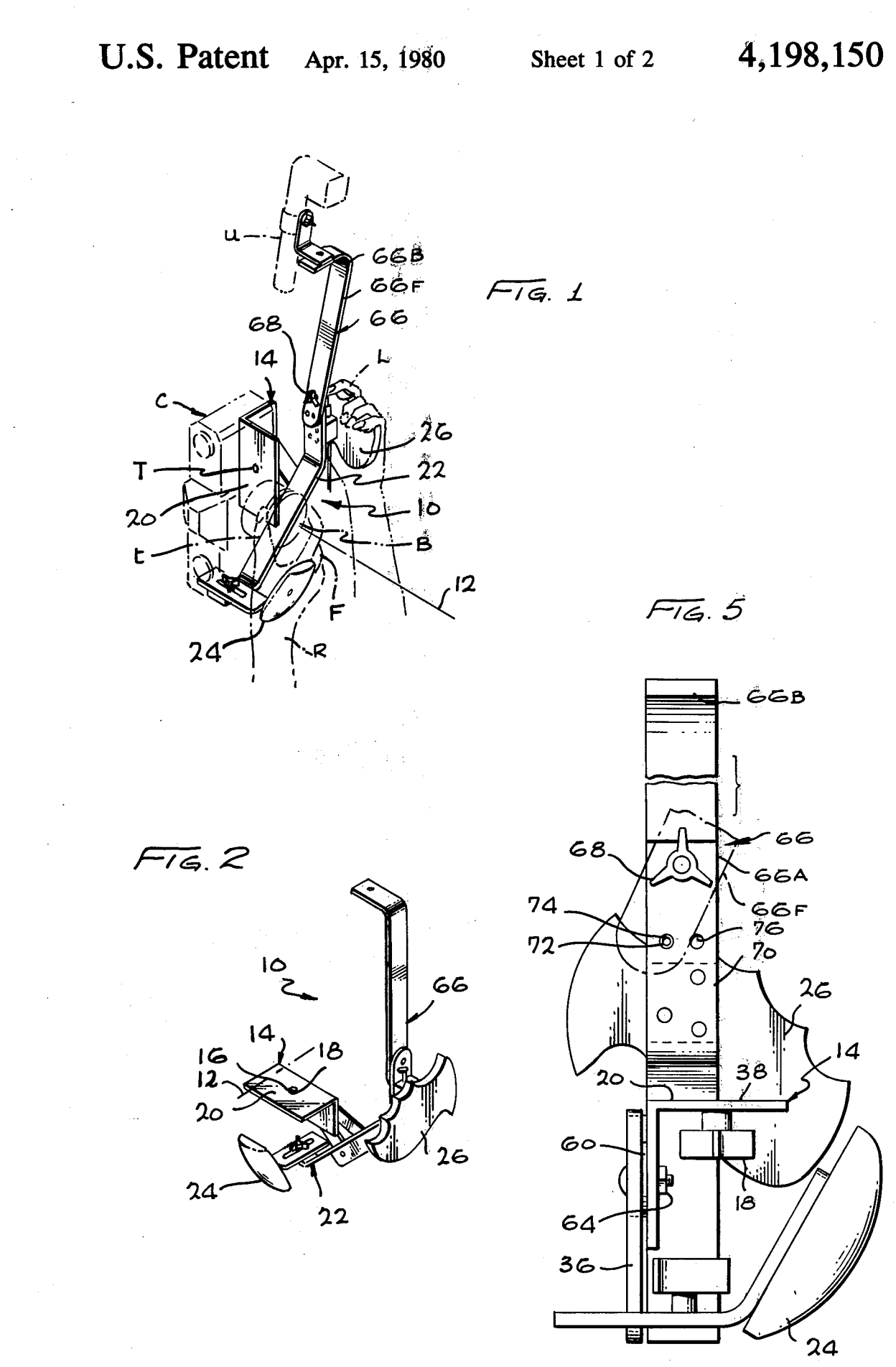
Figure 3:
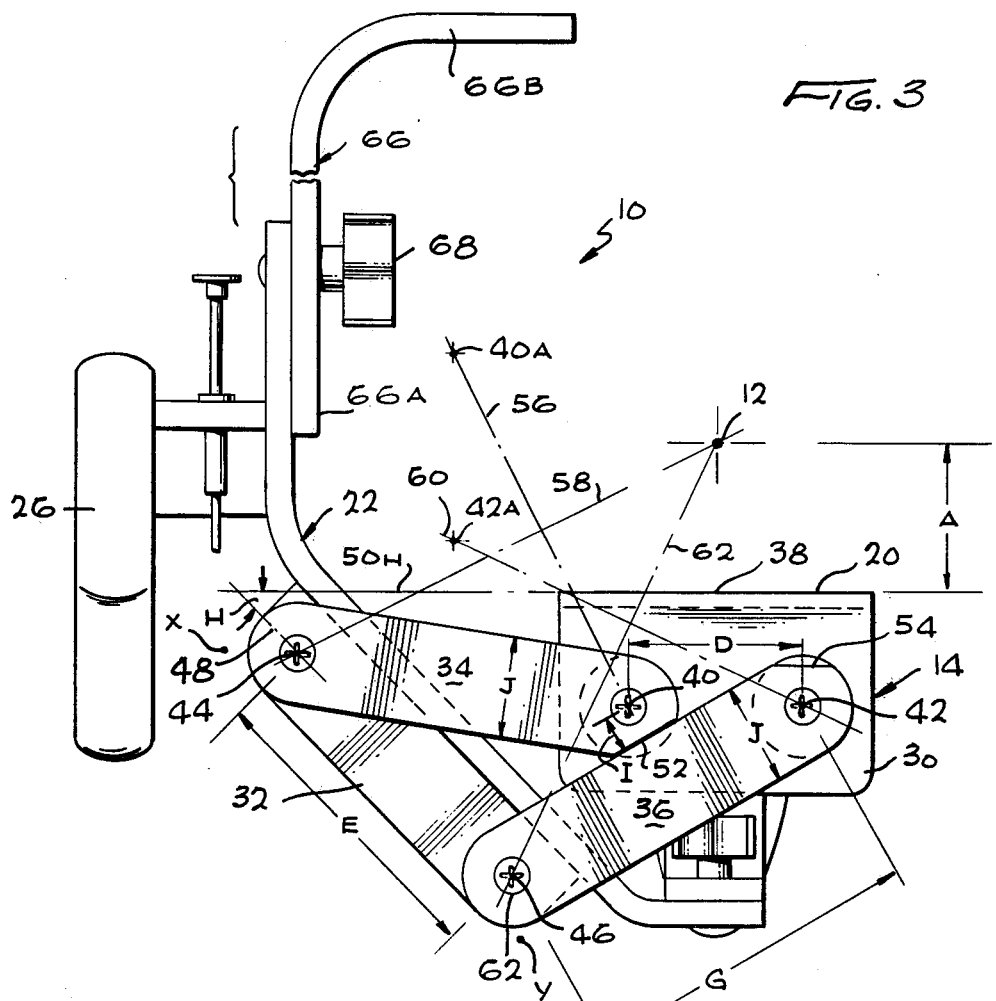
FIG. 3 is a partial rear elevation view of the apparatus of FIG. 1, shown with the mount in a horizontal position.

FIG. 1 illustrates a camera-holding apparatus 10 for holding a camera C that has a lens barrel B surrounding a lens with its axis extending along the line 12. The camera is mounted at its tripod-mounting location T on a camera mount 14 which has a hole 16 (FIG. 2) that holds a screw 18 that can thread into the threaded hole in the tripod mounting location of a camera, to hold the camera against a portion 20 of the mount. The mount is pivotally mounted on a frame 22 which carries a pair of handles 24, 26. A photographer can hold the handles with his hands R, L (FIG. 1) so the frame 22 is upright, and can easily pivot the mount 14 between the vertical position shown in FIG. 1 wherein the camera is vertical, and a horizontal position as shown in FIG. 2 (note that FIG. 2 also shows the frame 22 as seen from a different point of view) wherein the mount 14 and a camera thereon would be horizontal and rotated 90° from the position in FIG. 1.

One of the handles 24 is a palm pad designed to be held in the palm of the right hand, with several fingers F of the hand wrapped about the side of the pad to grasp it firmly. At the same time, the thumb t and/or the forefinger or middle finger can reach up to the lens barrel B to turn it so as to focus the lens. Focusing of the lens is normally performed immediately prior to taking a picture, and the ability to hold the frame while focusing the lens is highly useful. It is important that the axis 12 of the lens barrel remain in substantially the same position when the camera is turned 90°, to permit the hand which is holding the palm pad 24 to focus the lens in either position of the camera. Inasmuch as the frame can also be utilized to hold a flash unit U above the camera, it is also desirable to maintain the lens in substantially the same position after it rotates 90°, to avoid unwanted shadows which would occur if the camera shifts position with respect to the flash unit. It also may be noted that changing backs or film in a camera normally requires access to the back of the camera, and any obstruction immediately behind the camera, such as a pivot joint lying on the axis 12, would interfere with fast changing.

Figure 4:
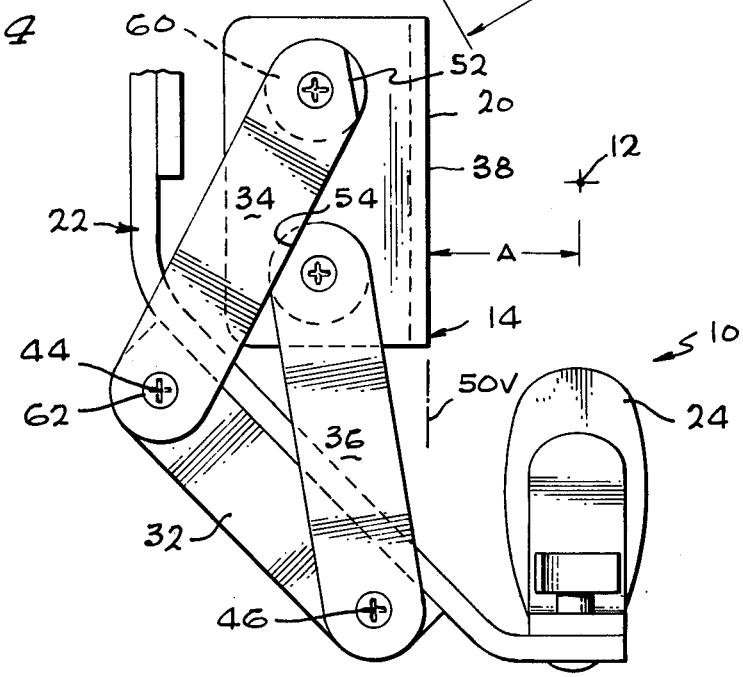
FIG. 4 is a view similar to FIG. 3, but with the mount in a vertical position.

In accordance with the present invention, the camera mount 14 is pivotally mounted on the frame 22, in the manner best shown in FIGS. 3 and 4, by a four-bar linkage mechanism. The four-bar linkage includes a lower portion 30 of the camera mount serving as one link that is to turn by 90°, a frame portion 32 that serves as a stationary link, and a pair of additional links 34, 36 that connect the frame portion 32 to the camera mount portion 30. When the apparatus is in the configuration of FIG. 3, the flat upper portion 38 of the camera mount, which includes the camera engaging portion 20, lies in a substantially horizontal plane when the frame 22 is upright as shown. The mount 14 can then be turned 90° and shifted to the position shown in FIG. 4, without changing the orientation of the frame 22. In the position of FIG. 4, the flat upper camera mount portion 38 lies in a vertical plane. In addition, the center of the camera-engaging portion 20 has been shifted to the left and upwardly by a sufficient amount so that the axis of the camera at 12 lies in the same position relative to the frame, and especially relative to the palm pad 24 on the frame, as it lies in FIG. 3.

In a typical professional camera the axis 12 of the camera will lie a distance A above the tripod mount location, which engages the mount portion 20, of approximately 1⅛ inches. The distance is typically 1⅛ to 1⅜ inch for a 35 mm camera, and 1½ to 1¾ inch for the larger 6×4.5 and 6×7 format camera, and 1½ inches is a compromise between these differences. Thus, the linkage is constructed so that the middle of the camera-engaging portion 20 shifts upwardly by about 1½ inches and to the left by 1½ inches when moving from the configuration of FIG. 3 to the configuration of FIG. 4. The particular illustrated linkage is constructed with the distance D between the pivot points 40, 42 of the outer ends of the links where they are mounted on the camera mount portion 30, being 1.8 inches. The distance E between the points 44, 46 where the inner ends of the links are pivotally mounted on the frame, is 3.121 inches, and each of the links has a length G as measure between the pivot points at its opposite ends, of 3.460 inches. In addition, an imaginary line 48 extending through the pivot points at the inner ends of the links, extends at an angle H of 45° with respect to an imaginary line 50H lying on the flat upper portion 38 of the camera mount when the camera mount is horizontal (and also 45° with respect to the camera mount surface 38 when it is vertical) and to an imaginary line connecting the outer end pivot points 40, 42. The upper portion 38 of the mount has a width, as seen in FIG. 3, of about 3 inches, which permits access to controls typically mounted on the bottom of a 35 mm camera near either end thereof. Each link 34, 36 has a width J of 1.0 inch, and is formed with a flat spot 52 spaced a distance I of 0.383 inch from the flat spot 52 to the nearest pivot point 40.

In either of the positions of the linkage, when it holds the mount horizontal or vertical, both links lie on a side of the camera mount portion 38 opposite the side where the camera would lie. Thus, the link 34 lies below the line 50H which lies on the mount upper portion 38, and therefore below the bottom of a camera thereon, and in FIG. 4 the link 36 lies to the left of an imaginary vertical line 50V. This construction of the linkage has the advantage that it allows a very wide camera to be held on the mount without interference from the linkage, so that a wide variety of cameras, including very wide types, can be utilized with the apparatus.

In order to facilitate rotation of a camera by 90°, stops should be provided to limit such rotation. Such stops are formed on the links, with a flat spot 52 formed at the outer end of link 34 causing it to abut a middle portion of the other link 36 when the upper camera mount portion has attained a horizontal position. A similar flat spot 54 on the other link 36 causes it to engage the middle of link 34 when the upper mount portion reaches a vertical position. The stop surfaces at 52 and 54 are the fastest moving portions of the linkage when each of them engages the other link to prevent further rotation of the camera mount. This results in a very definite and clear stopping of the apparatus, with very little force applied to the stop surface as compared to a situation where stops might be located on the frame portion 32. In addition, the use of flat spots at 52 and 54 on otherwise simple links having semicircular ends, permits a more compact linkage and therefore a more compact camera holding apparatus to be constructed, as will be described below.

The design of the linkage can be accomplished by first chosing two separate points 40, 42 at which the links will be mounted on the camera mount 14, and with these points at the same height and equally spaced from the axis 12 of the camera which is to be held, where a symmetrical linkage is desired. Then, two other points 40A and 42A may be established by turning each of the points 40, 42 clockwise by 90° about the axis 12. An imaginary line 56 connecting the two points 40, 40A may be drawn, and another imaginary line 58 may be drawn which bisects the line 56 and which passes through the axis 12. The axis such as 44 of the inner end of one link will lie along this line. In a similar manner another imaginary line 60 may be drawn between the points 42, 42A, which is bisected by another imaginary line 62, and with the pivot point such as 46 of the other link lying along this line 62. Where the two links such as 34, 36 will lie in the same plane, the pivot points of their inner ends such as 44, 46 must be spaced far enough from the axis 12 so that the links do not interfere with one another. This is an important consideration since the links must have a substantial width J to assure adequate strength. If the links were of the width shown for the links 34, 36, and with semicircular ends, but without the flat spots 52, 54, then the pivot points would have to be extended from 44, 46 to locations such as X, Y to avoid mutual interference of the links. This would significantly increase the lengths of the links and the size of the apparatus. Thus, the flat spots and the wide and strong links, not only serve as secure stops, but also reduce the size of the apparatus. It may be noted that each end of each of the links is spaced by a plastic shoulder washer 60 (FIG. 5) from the frame 22 and camera mount 14, to prevent rubbing of the metal links on the metal frame or mount and provide a smooth bearing with enough resistance to movement to keep the frame in position. Each link end is held by a screw 62 and a retained lock nut 64 at a corresponding point of the frame or camera mount.

As mentioned earlier, the frame 22 is designed to hold a flash unit at a location above the camera. This is accomplished by utilizing a frame member 66 (FIG. 5) having a lower portion 66A extending upwardly, and an upper portion 66B extending horizontally towards a position over the camera on the mount 14. The flash unit-holding frame member 66 is held in position by a screw 68 that holds it against a lower frame portion 70, and by a roll pin member 72 mounted on the lower frame portion 70 that fits into a hole 74 on the flash-holding frame member 66. The frame member 66 can be oriented as shown in FIG. 5 for use with 35 mm cameras or other cameras which are held at eye level when taking a picture. However, when utilizing some cameras wherein the photographer must look down while holding the camera at waist level, the handle 26 must be tilted toward the vertical and the flash unit should be located forward of the bent-down head of the photographer. The flash holding frame portion can be adjusted for waist level viewing by loosening the screw 68, and then turning the frame member 66 to the position 66F, as shown in FIG. 1 wherein the member 66 has been tilted forward so that its upper end and the flash unit U thereon are in front of the head of the photographer who is looking down into the camera. As indicated in FIG. 5, this is accomplished by shifting the position of the frame member 66 so that another hole 76 thereon receives the roll pin member 72. The position 66F is also useful for 35 mm cameras, where the photographer wishes to photograph a subject which is close to the camera, and wherein the forward tilting of the frame member permits the flash unit to be aimed at the nearby subject.

It should be noted that in typical motor drive cameras, the distance between the tripod mount and the lens axis is about 3½ inches to 4 inches. Accordingly, a specially designed frame is normally required for such cameras, wherein the position of a point located about 3¾ inches beyond the tripod-mount portion of the frame does not shift position when the camera mount rotates 90°.

Thus, the invention provides a camera holding apparatus which facilitates the turning of rectangular format cameras by 90° between its horizontal and vertical orientations, without obstructing the back of the camera, all in a relatively compact device that can be constructed and sold at moderate cost. This is accomplished by utilizing a four-bar linkage to connect a frame which is not normally rotated.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. Apparatus for use in holding a camera with a tripod-mounted portion located approximately a particular distance below the level of the axis of the lens of the camera, comprising:
   a frame;
   a camera mount including a camera holding portion for holding the tripod-mount portion of the camera;
   handle means positioned on said frame so that when said handle means is held by a hand, the thumb and a finger of that hand can turn the lens barrel of a camera on said camera mount; and
   linkage means for coupling said camera mount to said frame, including a first link having inner and outer ends respectively pivotally mounted on said frame and camera mount, and a second link having inner and outer ends respectively pivotally mounted on said frame and camera mount;
   said links mounted so that when said camera mount rotates 90° between first and second positions, the position of a point located on said camera at a predetermined distance beyond said tripod-mount portion is substantially not changed with respect to said frame, to enable turning of the lens barrel by the hand which is holding said handle means, in spite of a 90° rotation of the camera.

2. The apparatus described in claim 1 wherein:
   said first and second links are formed so that they abut one another at said first and second positions which are 90° apart, to prevent the linkage means from turning past said positions.

3. The apparatus described in claim 1 wherein:
   said handle means includes a handle which is normally held in a predetermined orientation;
   said camera mount is constructed so that when it lies in said first position the bottom of a camera lies substantially in a horizontal plane; and
   said first link inner end lies at a higher level than said second link inner end, and both the inner and outer axis of said first link lies at a level no higher than the level of said camera holding portion when said camera mount is in said first position, whereby to enable the mounting of a wide body camera on the camera mount without interference by the links.

4. The apparatus as described in claim 1 wherein:
   said linkage means is symmetrical, with the two links being the same length, their outer end pivot points being at the same distance from said camera holding portion, and their inner end pivot points located along an imaginary line angled substantially 45° from another imaginary line that connects said other pivot points.

5. The apparatus described in claim 1 wherein:
   the upper portion of said camera mount has a width of no more than about three inches, whereby the sides of an ordinary 35 mm camera extend far beyond said portion to permit easy access to controls on the bottom of a camera near one side thereof.

6. The apparatus described in claim 1 wherein:
   said links are mounted so that when said camera mount rotates 90° between said positions, the position of a point located 1½ inches beyond said tripod-mount portion is substantially not changed with respect to said frame.

7. The apparatus described in claim 1 wherein:
   said links are mounted so that when said camera mount rotates 90° between said positions, the position of a point located 3¾ inches beyond said tripod-mount portion is substantially not changed with respect to said frame.

8. Apparatus for holding a camera without obstructing the back of the camera, and for rotating the camera 90° without substantially changing the position of the camera lens axis, comprising:
   a camera mount having a portion attachable to the tripod mount at the bottom of the camera;
   a frame which includes a handle;
   a pair of links having inner ends pivotally mounted at spaced locations on said frame, and having outer ends pivotally mounted on said mount at spaced locations positioned on a side of said mount portion opposite the position of a camera thereon;
   said link ends positioned so that a predetermined axis location which would be occupied by the axis of a particular camera type on said mount, remains in substantially the same position with respect to said frame after rotation of the mount by 90° between two predetermined mount locations.

9. The apparatus described in claim 8 wherein:
   the pivot points of said outer link ends on said mount are located at first and second points when said mount is in a first of said mount locations, and are located at third and fourth points, respectively, when said mount is in a second of said mount locations;
   the pivot point of a first of said inner link ends on said frame, is located along a first imaginary line that extends through said predetermined axis location and that also extends through a point halfway between said first and third points;

the pivot point of a second of said inner link ends on said frame, is located along a second imaginary line that extends through a point halfway between said second and fourth points.

10. The apparatus described in claim 8 wherein:
said links have outer end portions that abut one another at each of said two predetermined mount locations to prevent pivoting of said mount beyond said locations.

11. Camera holding apparatus designed to be held by a photographer and to hold the tripod socket of a camera with a rotatable lens barrel, comprising:
a frame;
a camera support having a tripod-engaging portion for engaging the tripod socket of a camera;
a palm pad mounted on said frame so it lies under the lens barrel of a camera which is mounted on said camera support, said palm pad positioned so that a hand which receives the palm pad in its palm, can also reach up with fingers of that hand to turn the lens barrel of a camera on said support to focus the lens;
said camera support being mounted on said frame so it can turn 90°, and so that a predetermined axis beyond said tripod engaging portion lies at approximately the same location after the 90° turn as before, so that after turning 90° from the horizontal to the vertical the lens barrel has not substantially shifted position.

12. The apparatus described in claim 11 wherein:
said palm pad is formed thin enough and oriented at an incline, so that as the pad rests in the palm of a hand with a portion of the frame weight held by the palm, the little and ring fingers of the hand can curl around said forward portion of the palm pad to grasp it, and the thumb and another finger can grasp the lens barrel of a camera mounted on the camera holding portion of the frame to turn it to focus the camera.

13. The apparatus described in claim 11 including:
a linkage connecting said camera support to said frame, including a plurality of links lying beside the region immediately beyond said support where it holds a camera, and constructed to support said camera support in turning movement, and said camera support being devoid of a portion immediately behind said region where a camera can be held, whereby to facilitate changing of film on a camera mounted on said support.

* * * * *